(12) United States Patent
Wolfgram (10) Patent No.: US 7,543,406 B2
(45) Date of Patent: Jun. 9, 2009

(54) ANTI-FALSE TRIPPING ESCAPE-PROOF SINGLE-CATCH ANIMAL TRAP

(75) Inventor: Kirk W. Wolfgram, Rochester, MN (US)

(73) Assignee: Wolfgram Industries, Inc., Rochester, MN (US)

( * ) Notice: Subject to any disclaimer, the term of this patent is extended or adjusted under 35 U.S.C. 154(b) by 0 days.

(21) Appl. No.: 11/446,987

(22) Filed: Jun. 6, 2006

(65) Prior Publication Data

US 2007/0277426 A1   Dec. 6, 2007

(51) Int. Cl.
*A01M 23/08*   (2006.01)
(52) U.S. Cl. .................................. 43/67; 43/61; 43/63
(58) Field of Classification Search ............... 43/60, 43/61, 63, 67, 69, 71
See application file for complete search history.

(56) References Cited

U.S. PATENT DOCUMENTS

| | | | | |
|---|---|---|---|---|
| 154,889 A | * | 9/1874 | Morris | 43/67 |
| 212,151 A | * | 2/1879 | Neal | 43/67 |
| 617,617 A | * | 1/1899 | Thornley | 43/67 |
| 1,108,724 A | * | 8/1914 | Draper | 43/76 |
| 1,273,185 A | * | 7/1918 | Reich | 43/60 |
| 1,541,639 A | * | 6/1925 | Gregory | 43/67 |
| 1,581,297 A | * | 4/1926 | Schmuck | 43/60 |
| 1,726,493 A | * | 8/1929 | Kelley | 43/67 |
| 1,760,729 A | * | 5/1930 | Warner | 43/67 |
| 1,862,038 A | * | 6/1932 | Session | 43/67 |
| 2,475,462 A | * | 7/1949 | Rosen | 43/61 |
| 2,524,423 A | * | 10/1950 | Buford | 43/60 |
| 2,587,349 A | * | 2/1952 | Mace | 43/67 |
| 2,885,820 A | * | 5/1959 | Maggio | 43/61 |
| 3,177,608 A | * | 4/1965 | Lindelow | 43/61 |
| 4,232,472 A | * | 11/1980 | Muelling | 43/61 |
| 4,379,374 A | * | 4/1983 | Lindley | 43/61 |
| 4,550,523 A | * | 11/1985 | Spiller | 43/61 |
| 4,557,067 A | * | 12/1985 | Ha | 43/61 |
| 4,578,892 A | * | 4/1986 | Melton | 43/60 |
| 4,744,170 A | * | 5/1988 | Chow | 43/61 |

(Continued)

*Primary Examiner*—Kurt Rowan (57) ABSTRACT

A single use, reusable or disposable, animal trap suitable for trapping rodents, having a stable enclosure, an unstable internal floor that tilts to dose the trap, a locking mechanism to keep trap closed, and a release for said locking mechanism, where both the locking mechanism and release mechanism are unaffected by gravity once the trap has tripped, regardless of the orientation of the trap relative to gravity. The floor of the trap tilts back and forth allowing the animal to enter and leave the trap (each time leaving the trap in the open position), until the animal enters the trap far enough such that the floor tilts to one end closing the opening in the trap where the floor is then locked into the closed (or trapped) position with the animal inside. The trap's unstable floor is internal to the trap such that the animal is unable to trip the trap from outside the trap, and the unstable floor tilts when the animal is not present such that the trap remains set due to gravity, thus the trap is anti-false tripping since the trap can not be tripped by the animal without the animal being inside the trap. The release mechanism is provided to initially set the trap or to release the animal if the trap is to be reused and the release mechanism is also provided to ensure the locking mechanism does not release if the trap is disposed of. To reduce manufacturing cost, the trap may be constructed with as few as two component parts.

13 Claims, 6 Drawing Sheets

U.S. PATENT DOCUMENTS

| | | | |
|---|---|---|---|
| 5,615,515 A * | 4/1997 | Woodruff | 43/63 |
| 6,564,501 B1 * | 5/2003 | Schislyonok | 43/61 |
| 6,622,422 B2 * | 9/2003 | Gehret et al. | 43/61 |
| 6,684,560 B2 * | 2/2004 | Lafforthun | 43/61 |
| 6,990,766 B2 * | 1/2006 | Gehret et al. | 43/61 |

* cited by examiner

ANTI-FALSE TRIPPING ESCAPE-PROOF SINGLE-CATCH ANIMAL TRAP

FIELD OF INVENTION

The present invention relates to a single use, animal trap suitable for trapping rodents, having a stable enclosure with an opening at one end and an unstable floor that tilts to close the opening in the enclosure when the animal enters the trap and moves across the floor to the opposite end from the enclosure's opening. More particularly, the invention relates to the animal's inability to close (or trip) the trap from the outside due to the unstable floor being internal to the trap, and relates to the animal's inability to close the trap until the animal is so far inside capture is imminent. Prior to the animal entering the trap to the point the trap closes, the unstable floor is allowed to tilt back and forth allowing the animal to enter and leave the trap. Each time the animal leaves the trap, the trap is left in the open (or set) position. When the animal enters the trap far enough to tilt the floor to one end closing the opening in the trap, the floor is locked into the closed (or trapped) position. The lock used to keep the trap closed is provided with a release mechanism used to initially set (or open) the trap, and may be used to release the animal if the trap is to be reused. Both the lock and lock release mechanisms are unaffected by gravity once the trap is closed (trapped) to ensure the animal does not escape regardless of the orientation of the trap relative to gravity should the trap be disposed of. For reduced manufacturing cost, the trap has been constructed with as few as two component parts.

BACKGROUND OF THE INVENTION

Animal traps typically used for rodents are available using a variety of methods to capture or kill the rodent but can be generally classified into two groups, traps with powerful springs that attempt to kill the animal such as the familiar spring trap, and traps that capture the animal alive within an enclosure.

Spring traps such as those shown in U.S. Pat. No. 1,791,172 to Suhr, while generally effective provided the spring is strong enough, often mutilate the animal and do not contain the animal such that the trap may be dragged several feet leaving a trail of blood and feces. While this type of trap is inexpensive offering the option to dispose of the trap, the traps can catch fingers while trying to set, are messy, are unsanitary to remove the rodent from the trap, and occasionally allow careful enough rodents to steal the bait without being caught. While improvements have been made to the simple spring trap such as those disclosed in U.S. Pat. No. 4,369,595 to Kness where a bar was added to reduce the risk of catching fingers while setting the trap and reduce the mess related to releasing the animal from the trap, where the bait receptacle was moved off the trigger to eliminate trigger sensitivity change due weight of the bait, and where a larger trigger was added to reduce the risk of the animal stealing the bait, the spring trap still occasionally mutilates the animal, is unsanitary due to the blood and feces left around the trap, and can still easily trap fingers.

Traps that capture the animal alive within an enclosure can be can be sub divided into two smaller groups, multi-catch and single-catch live traps. While the multi-catch traps offer the ability to catch several rodents, they also have problems such as one animal escaping when another animal enters the trap, or problems such as one animal eating part of another animal leaving a decaying smelly carcass to rot in the trap.

Single-catch live traps do not have the same problems associated multi-catch traps such as one rodent releasing or eating another rodent, and generally do not have the problems such as mutilated animals, traps being dragged away, or fingers being caught in powerful springs like the problems associated with the spring trap type of animal trap. Single-catch traps do however have different set of problems such as higher cost (making them undesirable to dispose of), sensitive trigger and balance mechanisms, false tripping due to the animal tripping the trap from the outside, and traps opening when the trap is moved or disposed of allowing the animal to escape.

To reduce cost, single-catch live traps have been designed with as little as two component parts such as the traps shown in U.S. Pat. No, 4,550,523 to Spiller and U.S. Pat. No. 4,787,170 to Kingsbury. The patent to Spiller discloses a trap consisting of an enclosure with a fulcrum approximately mid-length, and a door that closes when the enclosure tips. The patent to Kingsbury shows a trap consisting of an enclosure and a door held closed by gravity requiring the animal push under the door to enter the trap. While these two component part type traps are inexpensive, the tilting type trap as disclosed by Spiller is often tripped when the animal climbs on the outside causing the trap to trip without the animal inside. This type of trap is also sensitive to the amount of bait inside the trap, and may allow the animal to escape if the door is bumped or if the trap is disposed of and not positioned right-side-up in the garbage. The type of trap shown by Kingsbury does not allow the animal to trip the trap from the outside, but is less desirable since it requires the animal push a door open to enter the trap which often keeps the animal from entering the trap in the first place. This type of trap also requires the trap be made from a clear material to visually detect the condition of the trap (empty or full) which is undesirable to some people, and may also allow the animal to escape if the door is bumped or if the trap is disposed of and not positioned right-side-up in the garbage.

Although more than two component parts are involved, traps such as the one shown in U.S. Pat. No. 6,564,501 to Schislyonok involving a design similar to Spiller but provided with a lock to keep the door closed, are often tripped when the animal climbs on the outside, are sensitive to the amount of bait inside the trap, and require the trap remain right-side-up and on the surface the trap was placed to ensure the lock functions correctly as stated in the body of Schislyonok's patent. Bumping the latch once the trap is picked up, or disposing of the trap by throwing it in the garbage and not leaving the trap's latch against a flat surface where the animal's weight keeps the latch secured may allow the latch to become disengaged allowing the animal to escape.

SUMMARY OF THE INVENTION

The present invention provides a single-catch animal trap for the purpose of capturing rodents consisting of two components, where the animal can not close (or trip) the trap without being inside the trap, where the trap is locked containing the animal in an escape-proof chamber when the animal closes the trap, where the lock can not be opened without appropriate pressure to a lock release mechanism for the lock, where the lock and lock release mechanism will not allow the trap to open regardless of the trap's orientation relative gravity, where the condition of the trap (open or closed) is visually discernable without having to see the animal in the trap, and where the trap is constructed without the use of powerful springs that can catch fingers, or a door that must be opened by the animal for the animal being trapped to enter.

The trap consists of an enclosure with an opening at one end and stable base, along with an unstable internal floor connected approximately mid-length of the floor to the enclosure in a manner that allows the floor to tilt in one direction, then in the oppsite direction due to the animals weight as the animal moves from one end of the unstable floor to the other end of the unstable floor. When the floor tilts in one direction, the opening in the enclosure is open allowing the animal being trapped to enter. When the floor tilts the other direction, the floor blocks the opening at the end of the enclosure and the floor is locked in place trapping the animal inside the enclosure. The lock used to lock the floor in the closed position is secured by a lock release mechanism such that neither the lock nor lock release mechanism is affected by gravity regardless of the orientation of the trap relative to gravity once the trap is closed. For redundancy, two locks and two lock release mechanisms are provided. For ease of use, the lock release mechanisms are located on opposite sides so they can be operated simultaneously with one hand, however only one lock and release mechanism is necessary keep the trap from opening by accident. The means of connecting the enclosure and floor is provided by an integrally molded hinge. The lock and lock release mechanism are also provided by being integrally molded into the enclosure and unstable floor such as to reduce the number of component parts to two reducing manufacturing cost.

To provide a floor that is optimally unstable, the floor rotates around a point that is below the surface the animal walks on. This causes the force the animal exerts on the floor when changing direction to exit the trap, to rotate the floor in the direction that closes the trap. Should the animal exit the trap, the floor is balanced such that the trap remains in the open (or set) position for the animal to enter as many times as necessary before the trap is fully closed and the unstable floor locks the animal inside. The floor is also provided with a raised edge that is integrally molded into the floor to keep the animal's feces within the trap once the trap is closed.

The trap is also provided with a bait receptacle that is integrally molded into the stable enclosure such that the bait does not affect the weighting and balance of the unstable floor. A second bait receptacle is also provided to increase the surface area of the bait allowing for a stronger odor, and to increase the volume of bait allowing the bait to last longer. A small vent is provided in the enclosure at the opposite of the opening for the animal to enter to allow airflow through the trap in an end to end direction past the bait receptacle(s).

The trap's unstable floor can be seen through the opening at the end of the enclosure so the trap's condition is visually discernable regarding the trap's condition (empty or full). The trap may consist of clear plastic to see the animal inside, however it may be desirable for some people to have the trap made of an opaque material so the rodent never has to be touched or seen.

DETAILED DESCRIPTION OF THE INVENTION

Figure 1:
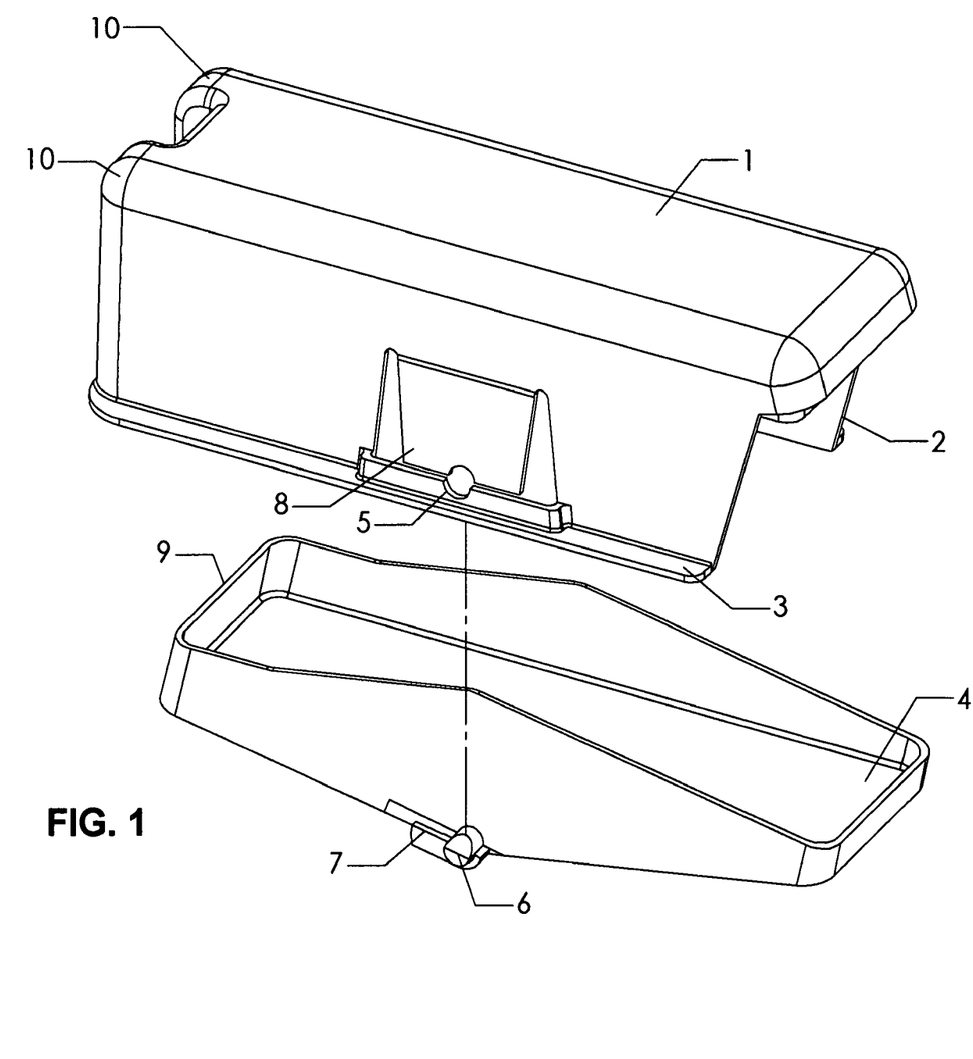
FIG. 1 is an exploded isometric view of a preferred embodiment of the present invention showing the enclosure and unstable floor.

Referring to FIG. 1, a preferred embodiment of the present invention is shown where the single-catch animal trap is comprised of an enclosure 1, with an open end 2, a stable base 3, and an unstable floor 4. The enclosure 1 is provided with a hinge 5 (consisting of a round opening on each side of the enclosure) and the unstable floor 4 is provided with hinge pins 6 (one on each side) located approximately mid length allowing the unstable floor 4 to be connected to the enclosure 1 such that the unstable floor 4 is allowed to tilt once the trap is assembled when the hinge pins 6 are placed into hinge 5. Also shown in FIG. 1 are the lock tabs 7 (one on each side), the lock release tabs 8 (one on each side), a raised flange 9 around the perimeter of the unstable floor 4 for containing the animal's feces once the trap is closed, and the outside of the bait receptacle 10 (two shown, one on each side). In this preferred embodiment of the present invention shown in FIG. 1, the lock tabs 7, the lock release tabs 8, and the bait receptacles 10 are provided in pairs for redundancy and improved performance to ensure the trap functions flawlessly, however, the trap will still function with only one lock 7, one lock release 8, and one bait receptacle 10. Also in this preferred embodiment of the present invention shown in FIG. 1, the hinge 5, the lock release tabs 8, and the bait receptacles 10 are integrally molded into the enclosure 1, while the hinge pins 6, the lock tabs 7, and the raised rib 9 for containing the animal's feces are integrally molded into the unstable floor 4 allowing the trap to be manufactured with only two component parts.

Figure 2:
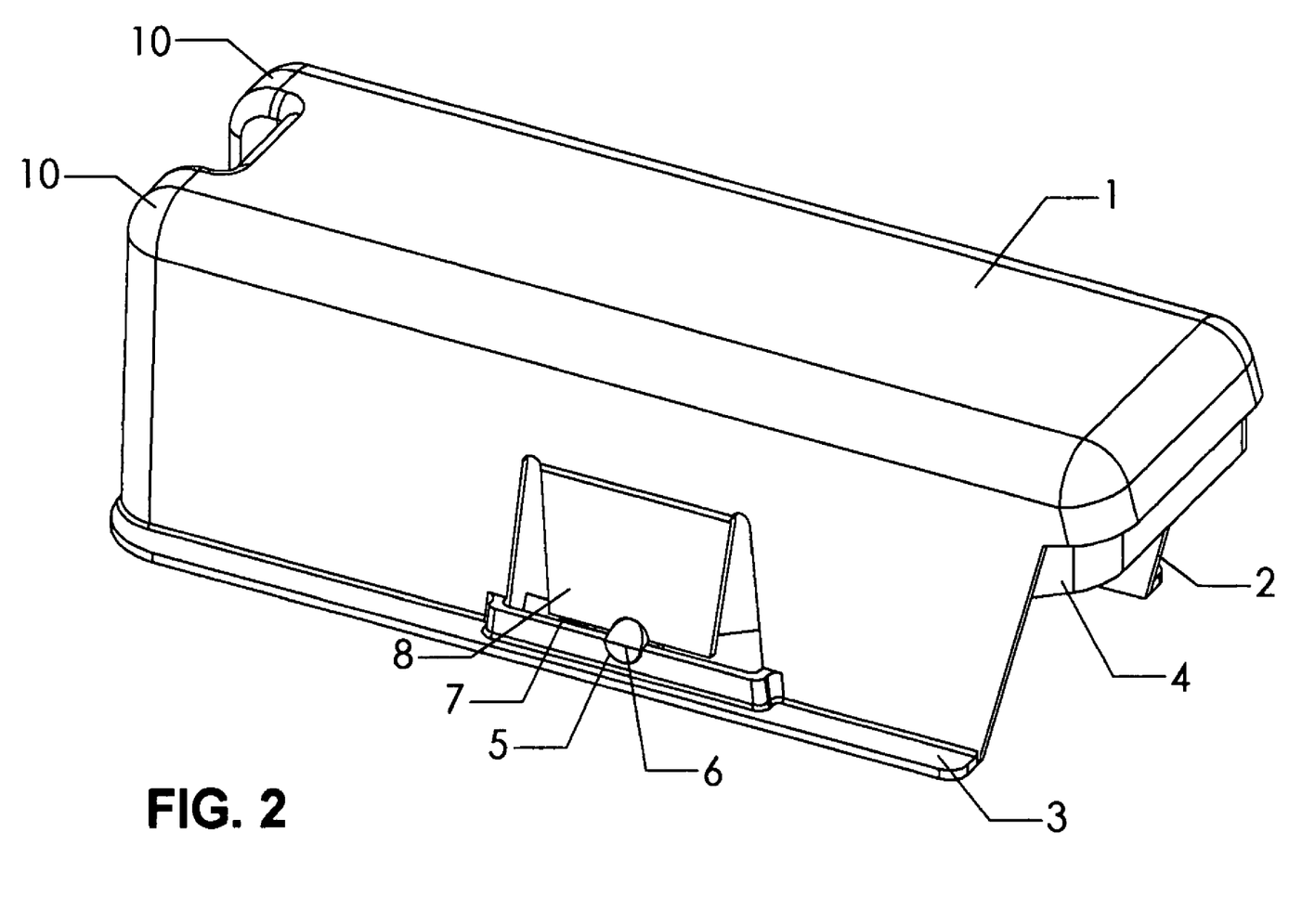
FIG. 2 is an isometric view of a preferred embodiment of the present invention from the same angle as FIG. 1 showing the trap closed, showing the lock locked, and showing release mechanism in the non-released position when the lock is locked.
Figure 3:
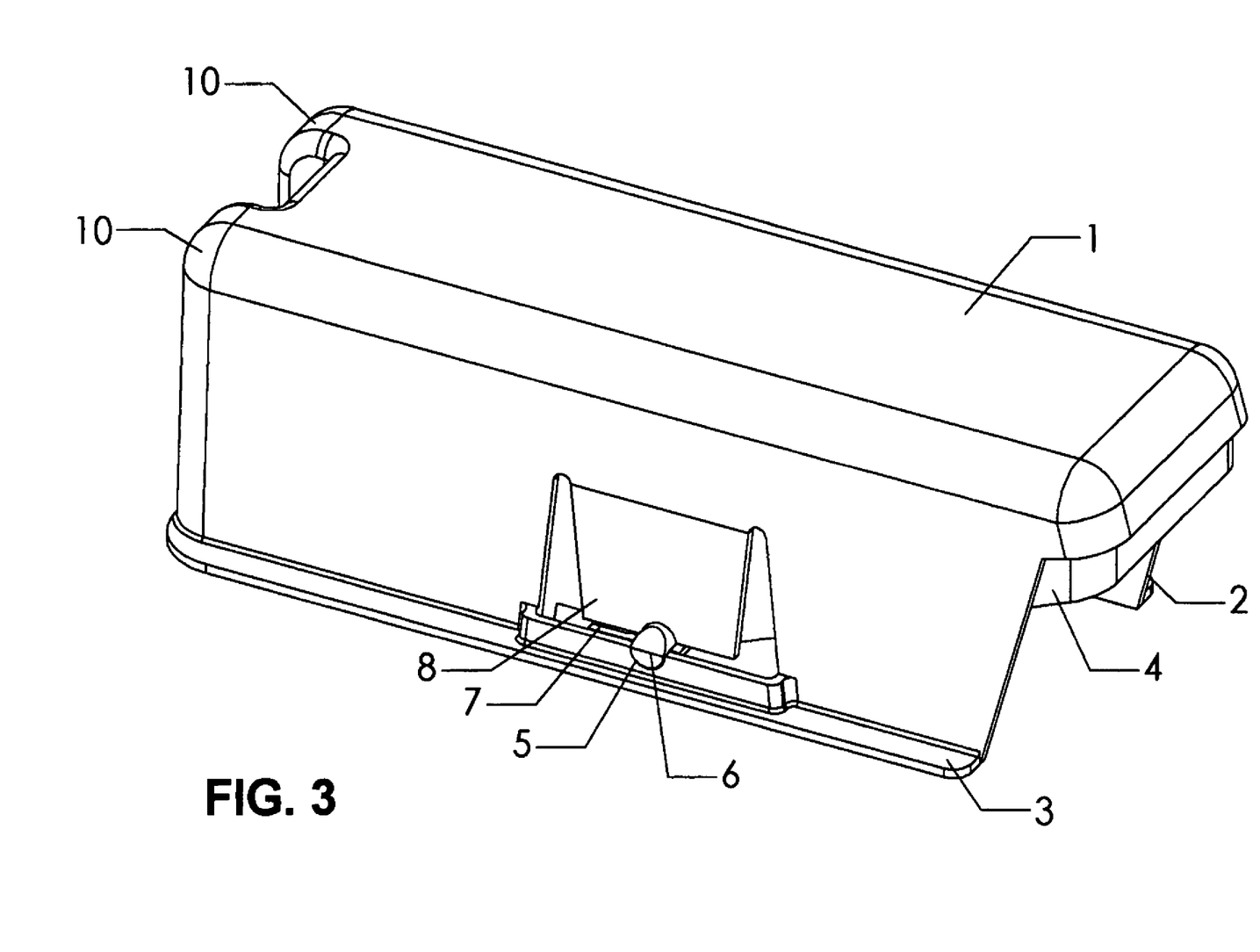
FIG. 3 is an isometric view of a preferred embodiment of the present invention from the same angle as FIG. 1 showing the trap closed, showing the lock in the lock position, and showing release mechanism in the released position.
Figure 4:
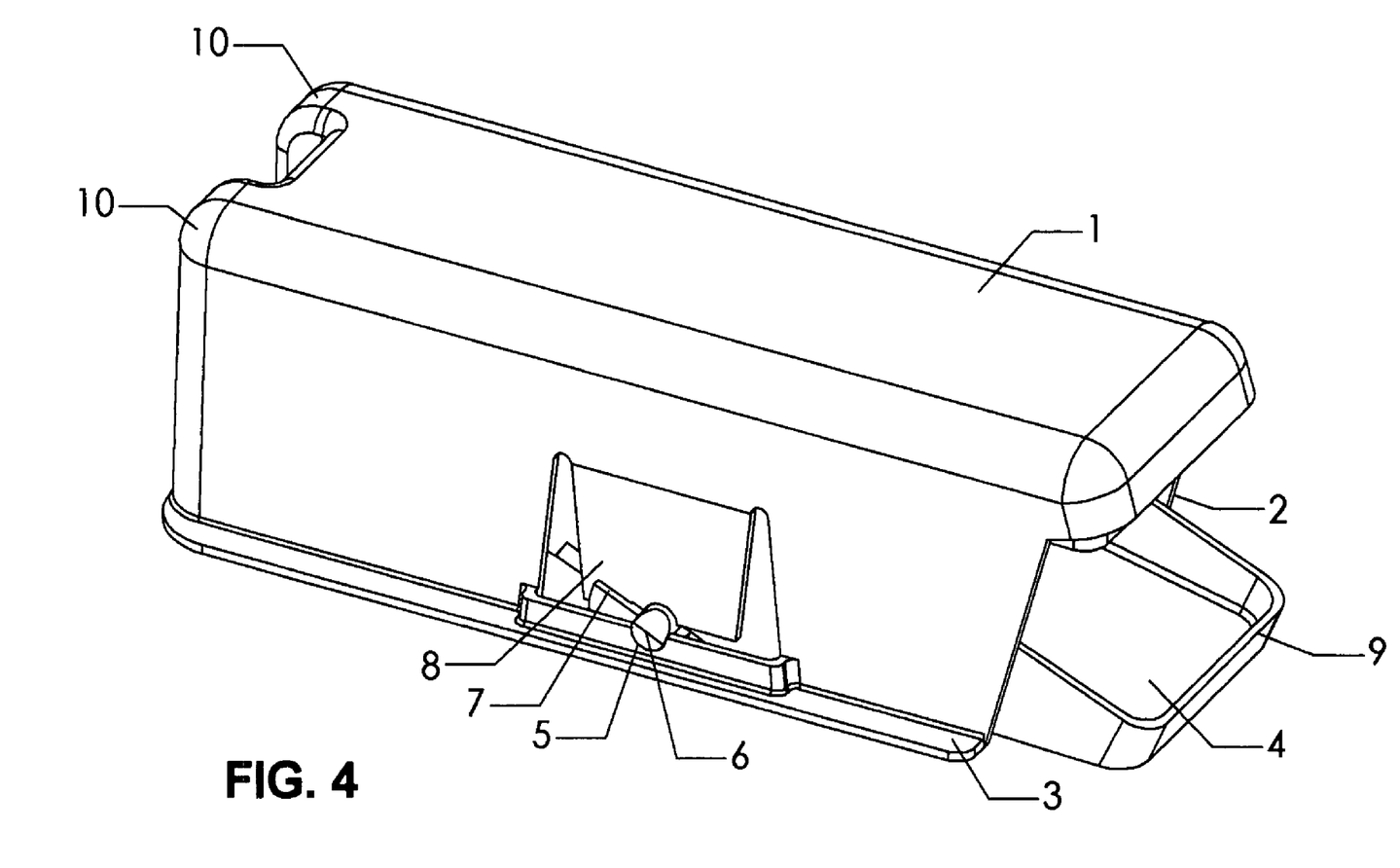
FIG. 4 is an isometric view of a preferred embodiment of the present invention from the same angle as FIG. 1 showing the trap open, showing the lock unlocked, and showing release mechanism in the non-released position when the lock is unlocked.

Referring to FIG. 2, the trap is shown with the unstable floor 4 tilted fully in one direction such that the unstable floor 4 blocks the open end 2 of the enclosure 1. With the unstable floor 4 in this position, the lock tab(s) 7 is locked in position by the lock release tab(s) 8 such that the floor is not allowed to tilt. Also with the unstable floor 4 in this position, the lock release tab(s) 8 are in a non-tensioned state. FIG. 3 shows the trap with the lock release tab(s) 8 pressed in such that the lock tab(s) 7 are not blocked allowing the unstable floor 4 to tilt in the direction where the unstable floor 4 no longer blocks the open end 2 of the enclosure 1. FIG. 4 shows the trap with the unstable floor 4 tilted fully in the opposite direction of that shown in FIG. 2 and FIG. 3 such that the open end 2 of the enclosure 1 is open allowing the animal being trapped to enter the trap. The lock release tab(s) 8 are held under tension in the same position as they are in FIG. 3 by the inside edge of the lock tab(s) 7 which keep the lock release tab(s) 8 from moving outward over the lock tab(s) 7 until the unstable floor 4 tilts back to the position where the unstable floor 4 blocks the open end 2 of the enclosure 1 as shown in FIG. 2.

While the unstable floor 4 is allowed to tilt back and forth as the animal being trapped enters and leaves, the unstable floor 4 is internal to the enclosure 1 such that the animal being trapped can not tilt the unstable floor 4 (or trip the trap) without being inside the trap, thus the trap is anti-false tripping. The trap's ability to allow the unstable floor to tilt back and forth as the animal enters and leaves the trap permits the animal to make several attempts to get the bait located in the bait receptacle(s) 10. Each time the animal leaves the trap, the unstable floor 4 is balanced such that the unstable floor 4 remains tilted to one end (as shown in FIG. 4) leaving the trap open (or set) for the animal to enter and try to get the bait again. Once the animal moves down the unstable floor 4 to the end near the bait receptacle(s), the animal's weight tilts the unstable floor 4. If the unstable floor 4 tilts fully in one direction to close the open end 2 of the enclosure 1 as shown in FIG. 3, the lock release tab(s) 8 pop out over, the lock tab(s) 7 locking the unstable floor 4 in place such that the animal is locked in an escape-proof enclosure. For optimal performance, the unstable floor 4 is located above the pivot point comprised of the hinge 5 and hinge pin 6. This pivot point below the surface the animal walks on causes the animal's momentum to rotate the floor in the direction that closes the trap when the animal changes direction to exit the trap helping to close the trap.

Once the trap is closed and the lock release tab(s) 8 have popped out moving back to the position shown in FIG. 2 where the lock release tab(s) 8 are not under tension, the lock release tab(s) 8 must be pressed in again (as shown in FIG. 3) to allow the floor to tilt (as shown in FIG. 4) to remove the animal. The lock release tab(s) are of adequate pressure to resist gravity regardless of the orientation of the trap should the trap be disposed of and land any orientation in the garbage. Two lock tabs 7 and two lock release tabs 8 are provided should one of the lock release tabs 8 get bumped into the release position when the trap is in the garbage.

Since the trap is anti-false tripping, once the trap is fully closed as shown in FIG. 2, the open end 2 of the enclosure 1 is visible without the unstable floor 4 such that one operating the trap can visually discern that the trap is full without having to see the animal inside the trap. This allows the trap to be manufactured using an opaque material so the animal can be disposed of without having see or touch the animal. However, the trap may be manufactured using a clear or translucent material if desired.

The size of the enclosure 1 and unstable floor 4 will vary with the animal being trapped. The enclosure 1 and unstable floor 4 must be large enough such that the animal can fit into the trap when the trap is open as shown in FIG. 4, and large enough that the animal being trapped can walk to the end of the unstable floor 4 near the bait receptacles 10. The unstable floor 4 must be long enough for the large majority of the animal being trapped to fit on the end of the unstable floor 4 near the bait receptacles 10.

Figure 5:
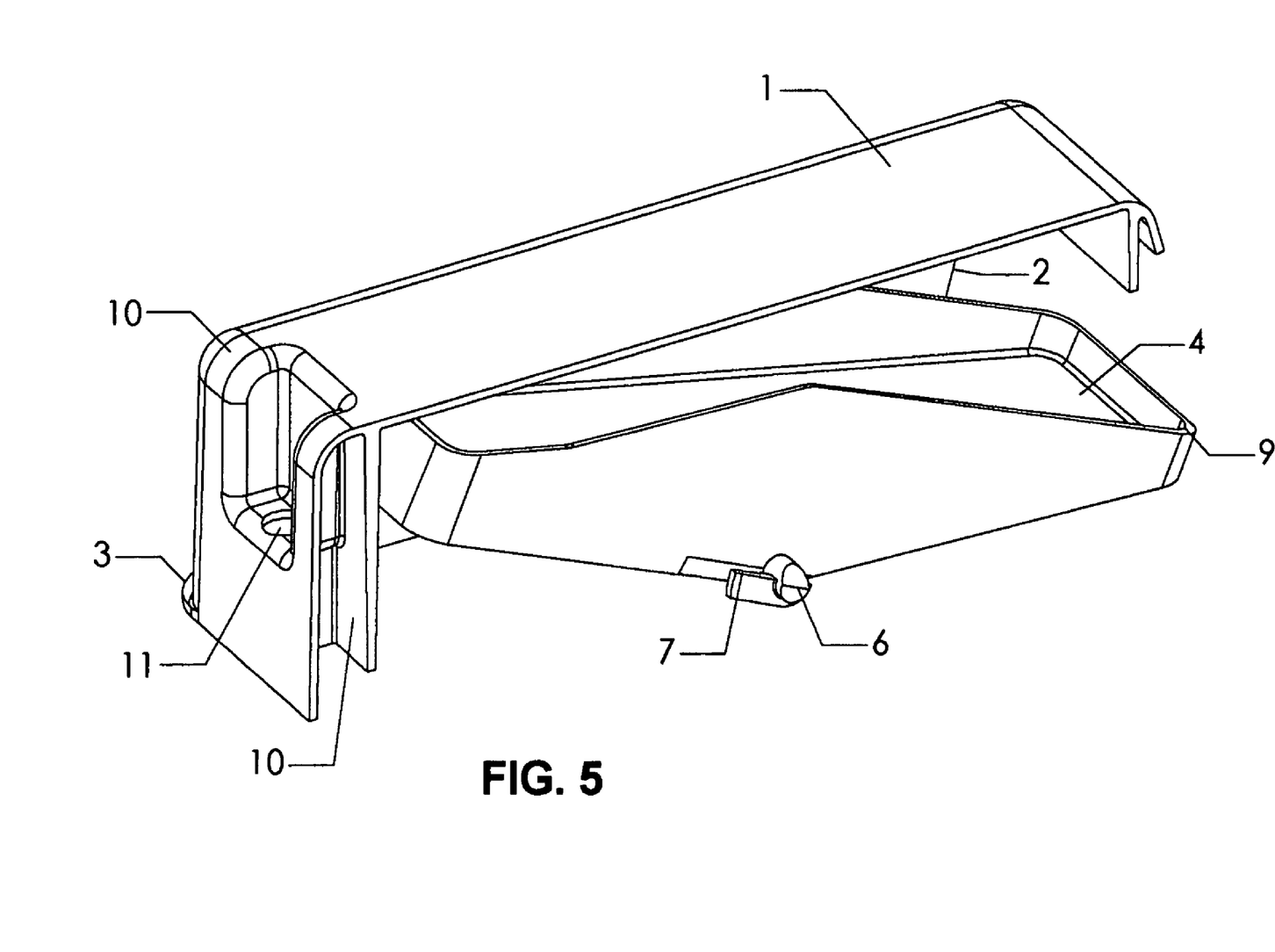
FIG. 5 is an isometric view of a preferred embodiment of the present invention with the enclosure cutaway showing the trap open from an angle showing the end in the enclosure opposite the open end.

Referring to FIG. 5, the trap is shown with part of the enclosure 1 cutaway exposing the inside of one of the bait receptacles 10. The unstable floor 4 is shown with the trap open (same position as FIG. 4). Also shown in FIG. 5 is the vent 11 which allows airflow through the trap such that air can pass through the vent 11, near the bait receptacle(s) 10, up over the end of the unstable floor 4 that is closest to the vent 11, and through the open end 2 of the enclosure 1. This airflow through the trap in an end to end direction allows the dispersal of the bait's odor similar to traps that are open (similar to the spring trap) which provides a significant improvement in odor dispersal compared to live traps where the bait is contained within an enclosure without airflow through the trap. The airflow does however increase the rate the bait dries out. For this reason, two bait receptacle(s) 10 are provided increasing the volume and surface area of the bait that is exposed to air.

Figure 6:
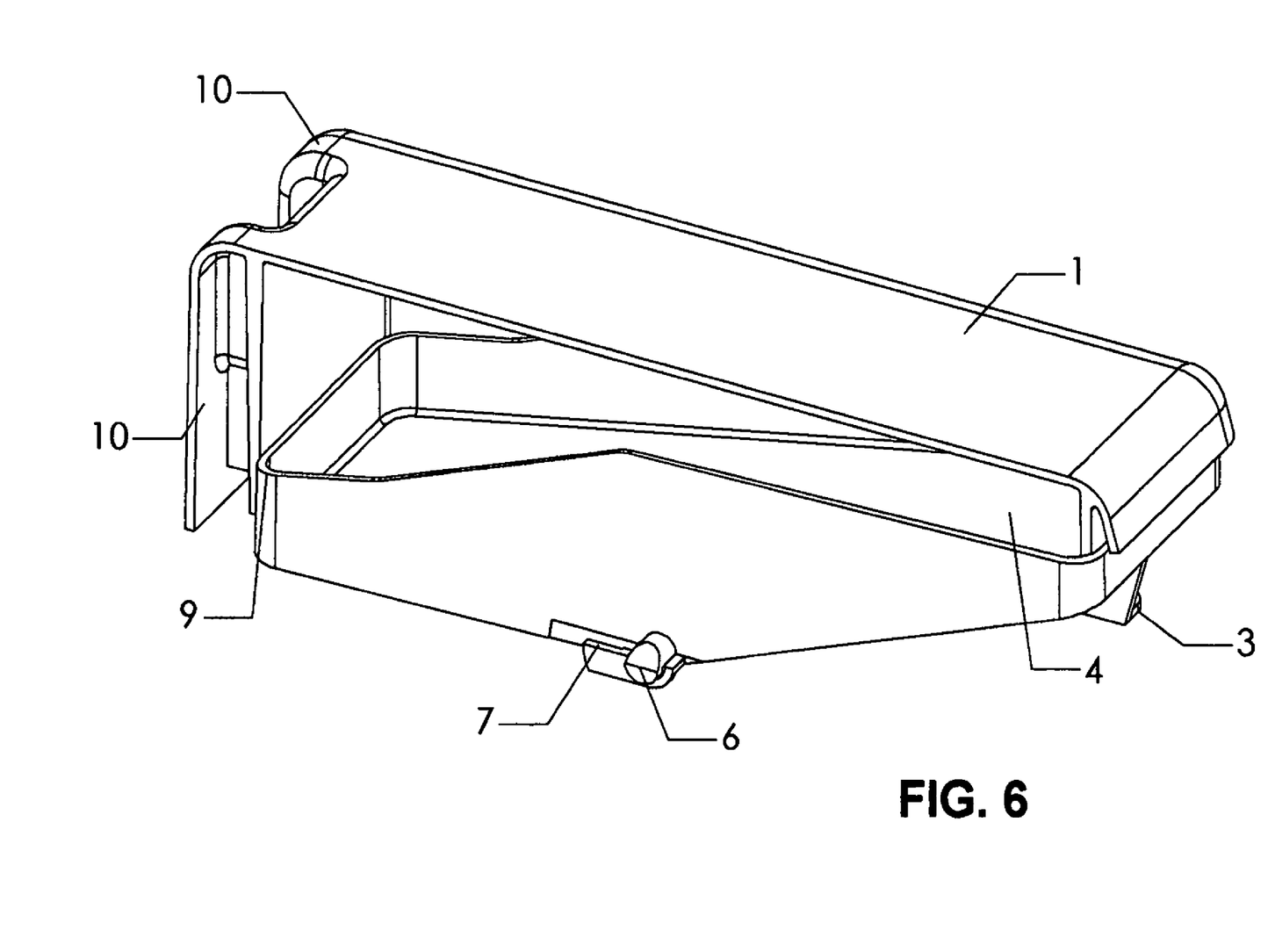
FIG. 6 is an isometric view of a preferred embodiment of the present invention with the enclosure cutaway shown from the same angle as FIG. 1 showing the trap closed.

To avoid changing the balance of the unstable floor 4, both bait receptacles 10 are part of the stable enclosure 1 rather than located on one of the trap's moving parts. Once the trap is closed as shown in FIG. 6, the unstable floor 4 tilts such that the raised flange 9 around the perimeter of the unstable floor 4 for containing the animal's feces seals against the bait receptacle(s) 10 trapping the animal between the unstable floor 4 and enclosure 1. When in this position, the trap creates an escape-proof chamber that contains the animal's feces between the trap's two component parts, does not require anyone see the animal to know the trap is full, and does not require anyone touch the animal to dispose of the animal and/or trap.

While several preferred embodiments of the present invention have been described, it should be understood that various changes, adaptations, and modifications may be made therein without departing from the spirit of the invention and the scope of the appended claims.

What is claimed is:

1. A single catch animal trap comprising:
   a housing having an open end for the animal being trapped to enter, and a stable base for said housing to rest on a surface;
   a tiltable floor located within said housing such that the animal being trapped has access to the floor only through the open end of said housing;
   a means of pivotably connecting said tiltable floor to said housing providing an enclosure, where the pivotably means of connecting provides a hinge positioned approximately mid length of said floor, where the hinge allows said floor to tilt in one direction such that the open end of said housing is open, where the hinge allows said floor to tilt in the opposite direction such that the open end of said housing is blocked by said floor, where the enclosure provided by said housing and said floor create an escape-proof chamber for the animal being trapped when said floor is tilted in the position where the open end of said housing is blocked by said floor;
   a chamber for containing the animal comprised of said housing and said floor, where the chamber is provided with a flange located at each end and provided with a flange located at each side to contain the animal within the trap between said enclosure and said floor once said floor is tilted in the position where the open of said housing is blocked by said floor;
   a locking mechanism for locking said tiltable floor when said floor tilts such that the open end of said housing is blocked by said tiltable floor, where the locking mechanism is unaffected by gravity regardless of the orientation of the trap relative to gravity, and where said locking mechanism locks said tiltable floor such that the tiltable floor can not tilt until the lock release mechanism releases the locking mechanism;
   and a lock release mechanism to release the locking mechanism, where the lock release mechanism is unaffected by gravity regardless of the orientation of the trap relative to gravity.

2. The animal trap of claim 1 where the position of said hinge is such that said floor tilts to a position where said housing's open end remains open when no force other than gravity is applied to said floor.

3. The animal trap of claim 1 where a position of said hinge is located below a surface of the animal walks on or stands on.

4. The animal trap of claim 1 where said tiltable floor is provided with a raised edge along the perimeter to contain the animal.

5. The animal trap of claim 1 where said trap is provided with a receptacle for bait where the location of said receptacle is located on a fixed part of said trap.

6. The animal trap of claim 5 where the location of said bait receptacle is inaccessible to the animal.

7. The animal trap of claim 5 where said enclosure is provided with a small vent opposite said housing's open end to allow airflow near said bait receptacle and through the trap in an end to end direction.

8. The animal trap of claim 1 where only two parts are used to manufacturer said animal trap.

9. The animal trap of claim 1 where at least two locking mechanisms are provided for locking said floor once said floor tilts such that the open end of said housing is blocked by said floor.

10. The animal trap of claim 1 where at lease two release mechanisms are provided to release said locking mechanism.

11. The animal trap of claim 10 where at least two release mechanisms are provided on opposite sides of the trap to allow control of both release mechanisms with one hand.

12. The animal trap of claim 1 where the condition of said trap is visually discernable.

13. The animal trap of claim 12 where said enclosure is opaque such that the animal can not be seen once the trap is closed.

* * * * *